United States Patent
Sorg

[11] Patent Number: 6,136,231
[45] Date of Patent: Oct. 24, 2000

[54] YTTRIUM CHROMITE CHROMIA THERMISTORS

[75] Inventor: David J. Sorg, St. Mary's, Pa.

[73] Assignee: Keystone Thermometrics, Inc., St. Mary's, Pa.

[21] Appl. No.: 09/197,256

[22] Filed: Nov. 20, 1998

[51] Int. Cl.[7] ............................................. H01B 1/06
[52] U.S. Cl. .................. 252/521.1; 252/500; 252/518.1; 501/132; 501/152; 338/22 R
[58] Field of Search ................................ 252/500, 520.1, 252/521.1, 518.1, 519.1; 501/110, 117, 132, 152; 338/22 R

[56] References Cited

U.S. PATENT DOCUMENTS

| | | | |
|---|---|---|---|
| 4,013,592 | 3/1977 | Matsuoka et al. | 252/521 |
| 4,110,260 | 8/1978 | Yamamoto et al. | 252/519 |
| 4,252,768 | 2/1981 | Perkins et al. | 264/332 |
| 5,476,822 | 12/1995 | Iwaya et al. | . |
| 5,610,111 | 3/1997 | Iwaya et al. | . |
| 5,637,543 | 6/1997 | Iwaya et al. | . |

*Primary Examiner*—Yogendra Gupta
*Assistant Examiner*—D. G. Hamlin
*Attorney, Agent, or Firm*—Lerner, David, Littenberg, Krumholz & Mentlik, LLP

[57] ABSTRACT

The present invention relates to rare earth elemental thermistors and compositions useful for making such thermistors. In particular, it relates to yttrium and chromium oxide based thermistor systems having at least two phases: $YCrO_3$ and $Cr_2O_3$ and their use for measuring temperature.

18 Claims, 1 Drawing Sheet

YTTRIUM CHROMITE CHROMIA THERMISTORS

FIELD OF THE INVENTION

The present invention relates to the fields of ceramics, electrical equipment and temperature sensing and in particular provides ceramic compositions and thermistors made therefrom, methods of making ceramic compositions and thermistors and methods of using same.

BACKGROUND OF THE INVENTION

A thermistor is a device in which the resistance or resistivity changes in a predictable and repeatable manner when exposed to a specified range of temperatures. A thermistor can be used to measure a set temperature or to monitor temperature variation. The potential usefulness of a particular material for producing a thermistor is judged on a number of factors including the rate of change in the material's electrical properties with a change in temperature; the consistency or linearity of that change throughout a given range of temperatures; and the ability of the material to be used over a wide range of temperatures. Other factors include ruggedness, ease of manufacture, cost, useful life and the like. A thermistor made from a particular ceramic material may be ideal when used at temperatures of between 800° C. and 900° C. However, despite the obvious value of such a thermistor, its relatively narrow temperature window would limit its overall utility to applications which constantly required the use of temperatures between 800 and 900° C. Accordingly, it has always been desirable to discover materials which can be used to produce thermistors having as wide a useful temperature range possible.

Thermistors based on lanthanum have been used in the past because of their relatively broad range of applicability. Lanthanum chromium thermistors, for example, can be used at temperatures as low as −50° C. and as high as about 900° C. Unfortunately, these $LaCrO_3$ based thermistors must be glazed with a glass or glass-like coating because $LaCrO_3$ undergoes a structural transition at 270° C. which causes a resistance change. This transition is prevented by glassing or glazing. Unfortunately, most of the glazes are only useful at temperatures up to about 900° C. Above about 900° C., they melt thereby exposing the lanthanum based thermistor to the undesirable structural transition.

Iwaya et al., U.S. Pat. Nos. 5,476,822, 5,610,111 and 5,637,543 each disclose thermistors made from various ceramic compositions. The '543 patent describes a ceramic composition for a thermistor represented by the formula $(YCrO_3)_{1-x}(YAlO_3)_x$ where 0.8>X>0. The '822 patent contains similar claims although much broader in scope. Again, however, an aluminum oxide based phase is required. The '111 patent claims a ceramic composition for a thermistor represented by the formula: $(Y_{1-x}Sr_x)(Cr_{1-y-x}Fe_yTi_z)O_3$ where X, Y and Z are specifically defined.

All three of these patents describe the resulting ceramic composition as being useful over a range of from room or ambient temperature up to about 1100° C. However, a review of their complete disclosures suggest applicability only between about 300° C. and 1100° C. Indeed, a review of table 1 of the '822 patent demonstrates that the Beta values of the disclosed materials was higher at lower temperatures than at higher temperatures. Moreover, the aluminum oxide phase is a high resistance insulator type material. As a result, these formulations are not generally suitable for use at lower temperatures.

SUMMARY OF THE INVENTION

In accordance with the present invention, there is provided a ceramic composition which, when used in a thermistor, provides a thermistor which is capable of use over a broad range of temperatures, including high temperature applications such as 1100° C. as well as generally lower temperature applications at 0C and below. The ceramic compositions in accordance with the present invention include at least one rare earth element, preferably Y, and a stoichiometric excess of Cr. The ceramic compositions include at least a first phase having the formula $XCrO_3$ where "X" is a rare earth element, and preferably the first phase has the formula $YCrO_3$ (yttrium chromite). These compositions also have at least a second phase having the formula $Cr_2O_3$ (chromia).

More preferably, the ceramic compositions of the present invention may include: Ti provided in an amount of between about 0 and about 5% by weight based on the weight of the ceramic composition, Si provided in an amount of between about 0 and about 5% by weight based on the weight of the ceramic composition and Ca provided in an amount of between about 0 and about 5% by weight based on the weight of the ceramic composition are also presented. Generally, the total mole % of such additional components provided ranges as high as about 20% and most often up to about 15% mole %. These ceramic compositions are often sintered to make them hard and cohesive.

Preferably, these compositions are used in the thermistors. They are sized, shaped and provided with electrical contacts suitable for placing the thermistor into an electrical connection or electrical contact with a circuit or another device.

It has been discovered that unlike the suggestions of the '822 and '543 patents previously mentioned, it is possible to make rare earth and chromium based thermistors without the use of an aluminum oxide phase. The result is a thermistor capable of measuring at low temperatures comparable to that achieved through the use of prior known lanthanum based ceramic compositions as well as at high temperatures comparable to those achieved using yttrium and chromium thermistors incorporating a yttrium aluminum oxide ($YAlO_3$) phase.

The ceramic compositions in accordance with the present invention include at least two phases, both of which are based on chromium oxide. The first phase has a formula $XCrO_3$ and the second phase has a formula $Cr_2O_3$. The chromia ($Cr_2O_3$) phase, unlike the aluminum based phases previously discussed, is a good conductor at high temperatures. In fact, chromia based thermistors which include small amounts of titanium, calcium and silicon oxides, have been used in high temperature thermistors which are useful at above 350° C. This material is not insulating as is the case of $YAlO_3$.

In addition, it has been found that thermistors made from the ceramic compositions of the present invention exhibit Beta values which are lower at lower temperatures and increase as temperatures rise. A thermistor produced from a typical yttrium composition in accordance with the present invention gave Beta values of 2819K between room temperature (about 25° C.) and 150° C., 3059K between 150° C. and 300° C., 3400K between 300° C. and 450° C. and 4072K between 450° C. and 750° C. Thus the ceramic compositions of the present invention are useful at lower temperatures.

While the prior art yttrium based materials do not appear to be able to provide resistance values below room temperature, if even that low, materials in accordance with the present invention gave readings of 2.91 MegaOhm at −50° C.

DETAILED DESCRIPTION OF THE PREFERRED EMBODIMENTS

Figure 1:
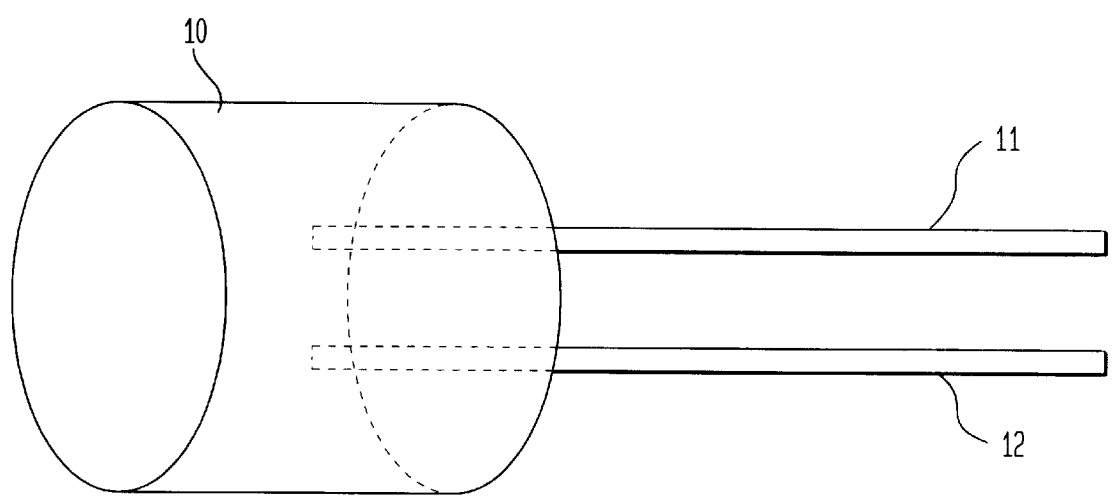
FIG. 1 is a perspective view of a thermistor in accordance with the present invention.

In one embodiment, a thermistor which can be produced in accordance with the present invention is illustrated in FIG. 1. The thermistor includes a body 10 composed of a ceramic composition in accordance with the present invention. Electrical contacts, 11 and 12, are provided to allow the thermistor to be placed in electrical connection or electrical contact with a circuit or other device. Often this can be accomplished through lead wires (not shown). However, any other method of allowing a circuit or device to obtain data regarding the change in electrical properties of the ceramic composition at a specific temperature or over a range of temperatures is contemplated.

The ceramic composition of the present invention includes either a rare earth element and more preferably praseodymium (Pr), neodymium (Nd), samarium (Sm), Europium (Eu), gadolinium (Gd), terbium (Tb), dysprosium (Dy), erbium (Er), ytterbium (Yb) or yttrium (Y). For convenience, these will all be referred to herein as rare earth elements and represented in formula by "X". Y is preferred. The ceramic compositions also include a stoichiometric excess of chromium ("Cr"). Preferably, the amount of Cr provided will exceed the amount of X provided by between about 1 and about 9800 mole % based on the mole % of the X in the composition. More preferably the amount of Cr provided will exceed the amount of X by an amount of between about 300 and about 500 mole %.

The ceramic composition of the present invention includes at least two phases. The first phase has the formula $XCrO_3$ and the second phase has the formula $Cr_2O_3$. It is understood, however, that in the manufacture of a ceramic material, a number of other phases are possible, albeit generally in lower proportions. This is particularly true when additional ingredients, such as titanium, silicon and/or calcium are added. Some or all of these materials may form phases with the $XCrO_3$ phase or the $Cr_2O_3$ phase thereby forming a third phase, or they may exist as a discreet third phase in and of themselves. Many such phases are possible. Preferably, the combination of the first and second phases will make up a majority of the ceramic composition on a percent by weight basis.

The ceramic compositions in accordance with the present invention can also be described based on the content of their various constituent elements. Preferably, the ceramic composition contains X provided in an amount of between about 1 and about 49 mole % based on the total content of metals (components other than oxygen) in the ceramic composition. For convenience, this will be referred to herein as "mole % based on TCM." More preferably, the amount of X provided ranges from between about 5 to about 30 and most preferably from between about 10 to about 20 mole % based on TCM. The amount of Cr provided should exceed the amount of X provided. The amount of Cr provided can generally range from between about 51 to about 99 mole % based on TCM. More preferably, the amount of Cr will range from between about 60 to about 90 and most preferably from between about 70 to about 80 mole % based on TCM.

The ceramic compositions in accordance with the present invention can be defined merely in terms of X and Cr content and the predominant resulting phases. While ceramic material produced only from X and Cr as described would, on the whole, be useful over a wide range of operable temperatures, it would be generally unsuitable for the rigors of a thermistor. Preferably the composition is sintered and more preferably the ceramic composition will include a predetermined amount of at least one other component, also referred to herein as "component M" wherein M can be Ti, Ca, Si, Al, Mg, Sr, Ba, Zr, Hf, Ge or Ce. While these additional components often act as sintering aids, they are also important in tailoring the performance and electrical properties of the ceramic compositions. Most preferably, in accordance with the present invention, a plurality of components M are provided, such as Ti, Si and Ca. Any number of additional components M may be provided so long as they do not adversely affect the basic and novel characteristics of the invention, namely the ability to use the resulting ceramic composition in a thermistor over a broad range of temperatures including temperatures below the freezing point of water and up to in excess of 900° C. and more preferably, between about −50° C. and about 1100° C.

The amount of such components M is always less than the amount of X provided in mole % based on TCM. Therefore, if 3, 4 or 5 additional components M are provided, combined they will be provided in an amount which is less than that of X. Preferably the predetermined amount of said components M ranges from between about 1 to about 20 mole % based on TCM and more preferably between about 5 to about 15 mole % total for all components M.

A particularly preferred embodiment in accordance with the present invention is a ceramic composition including X and a stoichiometric excess of Cr and including at least a first phase of formula $XCrO_3$ and at least the second phase having the formula $Cr_2O_3$. The ceramic composition also includes titanium, silicon, and calcium. Most preferably, the first phase is $YCrO_3$ and the second phase is $Cr_2O_3$. Preferably, titanium is provided in an amount of between about 1 to about 8 mole % based on TCM, silicon is provided in an amount of between about 0.5 to about 6 mole % based on TCM, and calcium is provided in an amount of between about 0.5 to about 6 mole % based on TCM.

More preferably, X is provided in an amount of between about 5 to about 30 mole % based on TCM, Cr is provided in an amount of between about 60 to about 90 mole % based on TCM, Ti is provided in an amount of between about 2 to about 6 mole % based on TCM, Si is provided in an amount of between about 1 to about 4 mole % based on TCM, and Ca is provided in an amount of between about 1 to about 4 mole % based on TCM.

Most preferably, X is provided in an amount of between about 10 to about 20 mole % based on TCM, Cr is provided in an amount of between about 70 to about 80 mole % based on TCM, Ti is provided in an amount of between about 3 to about 5 mole % based on TCM, Si is provided in an amount of between about 2 to about 3 mole % based on TCM, and Ca is provided in an amount of between about 2 to about 3 mole % based on TCM.

Not only can individual rare earth elements, such as yttrium, be used as described herein, it is possible to use mixtures of two or more of the rare earth elements. This may, however, alter the number of phases and/or the composition of individual phases.

A particularly preferred embodiment, the ceramic composition of the present invention, includes yttrium as X provided in an amount of between about 10 and about 20 mole % based on TCM along with a stoichiometric excess of chromium provided in an amount of between about 70 and about 80 mole % based on TCM. This formulation can further include between about 2 and about 5 % of each of Ti, Ca and Si, in mole %, based on TCM.

Table 1 contains resistance values, at several temperatures, for various rare earth element based thermistors in accordance with the present invention. These rare earth element based thermistors were generally produced as described in example 1 (except as noted below) and each contained a rare earth element in the same mole percentage as that of yttrium described therein.

TABLE 1

| Rare Earth | R @ 24.6 C. | R @ 150 C. | R @ 300 C. | R @ 450 C. | R @ 750 C. | Beta (150–300) |
|---|---|---|---|---|---|---|
| Pr | >200M | 6.73M | 55.4K | 2.63K | 106.4 | 7760K |
| Nd | 265K | 7.19K | 684.5 | 166.8 | 42.1 | 3802K |
| Sm | >200M | 4.17M | 186K | 15.5K | 1008 | 5028K |
| Eu | 41.2M | 354.7K | 19.5K | 3.707K | 414.1 | 4690K |
| Gd | 21.7M | 239.4K | 13.4K | 1.904K | 177.2 | 4661K |
| Tb | 33M | 312.1K | 22.8K | 5.045K | 531.2 | 4231K |
| Dy | 30M | 483.4K | 32.7K | 4.422K | 348.2 | 4356K |
| Er | 135.6K | 8.914K | 1.448K | 403.4 | 82.3 | 2939K |
| Yb | 149.4K | 8.455K | 1.025K | 251.5 | 54.9 | 3412K |
| Y | 194K | 11.6K | 1.734K | 495.8K | 90.2 | 3073K |

The mixes were produced by a two hour wet mill process with the following exceptions: Sm and Tb used two hour dry mill procedures; Nd used a four hour wet mill process after eight hours at 1200° C. calcine. In addition, the Eu and Tb samples were formed into thermistors having a smaller bead with four mil wire. However, it has been observed that this size bead gives similar resistances to larger sizes of other materials.

In Table 1, in the resistance columns, "M" means Megaohms, "K" means Kiloohms, and no suffix means Ohms. In the Beta column, "K" stands for Kelvin.

Generally the ceramic compositions and thermistors made therefrom in accordance with the present invention can be manufactured as follows: rare earth oxides, $Cr_2O_3$, CaO, $TiO_2$, and $SiO_2$ are measured to provide the desirable formulation and are charged to a jar mill. Often the CaO and/or other hygroscopic materials may be heated prior to being weighed to drive off water. Therefore, CaO can be heated to 800° C. for half an hour before weighing. Water is added to the powders and the materials milled for several hours and dried. Then polyvinyl alcohol and ethylene bis-stereamide are added as binder and lubricant and mixed in the mill with the powders. Generally, binders or lubricants can be added at an amount of less than about 5% by weight of the finished ceramic and generally between about 1 and about 3% by weight. Other binders include various cellulose derivatives such as cellulose, methylcellulose, carboxymethylcellulose, polyacrylates and the like. Lubricants can include glycols, phthalates and others known in the ceramics industry. Surfactants and other excipients can also be added as well, up to about 5% by weight.

Milling continues for less than an hour and the powders are then re-wet with water, dried and run through a screen to get the desired particle size. Dry milling and calcining may also be used to make the ceramics of the present invention. A general discussion of various methods of producing ceramics can be found in the Treatise on Material Science and Technology, Volume 9 (Ceramic Fabrication Processes), edited by Franklyn F. Y. Yang, 1976, available through the Academic Press, the text of which is hereby incorporated by reference.

Preferably, particle size in accordance with the present invention range from between about 100 to about 500 microns and more preferably from between about 200 to about 400. Most preferably, the average particle size will range from about 250 to about 355 microns.

The resulting material is then molded and electrical contacts applied. For example, the materials could be molded into cylindrical beads of about 0.1" in diameter and about 0.075" in length with at least to 10 mil zirconia grain stabilized (ZGS) platinum wires are imbedded therein. Optionally, but most preferably, the beads can then be sintered using conventional sintering methods. It is preferable, however, to sinter the beads for one hour at 1560° C. in argon and then one hour at 1560° C. in air, followed by four hours at 1225° C. and two hours at 1125° C. The beads densified in argon but not in all other environments.

While it is not required, it may be desirable to glaze or glass the resulting thermistors for their protection. This would only be appropriate, however, where the temperatures which will be applied are generally about 900° C. and below. Glazing can be accomplished using, for example, by dipping the thermistors in AREMCOSEAL 617 glaze and run through a furnace at 2048° F. at a rate of 10' per hour on a conveyor. This step is then desirably repeated.

EXAMPLE 1

42.5 grams of $Y_2O_3$, 142.5 grams of $Cr_2O_3$ were weighed out and mixed with 4 grams of CaO, 8 grams of $TiO_2$ and 4 grams of $SiO_2$. The CaO was heated to 800° C. for half an hour before weighing. The powders were put in a jar mill with 333 ml of water and milled for four hours, dried, 3 grams of polyvinyl alcohol and 4 grams of ACRAWAX C (ethylene bis-stereamide) were added as binder and lubricant and mixed in the mill for fifteen minutes. The powders were re-wet with water, dried and run through a screen to get the desired particle size of 250–355 microns. Thermistors were then molded, having a body of 0.100 inches in diameter, 0.075 inches in height with 10mil diameter ZGS platinum embedded therein. The thermistors were then sintered at one hour at 1560° C. in argon and then one hour at 1560° C. in air followed by four hours at 1225° C. and then two hours at 1125° C. Thereafter, the material was allowed to cool to room temperature.

The resulting materials were tested using a no load life test, a cycle test and a determination of the R/T characteristics. No load tests included exposing thermistors to various temperatures for various periods of time, both in a bare and glazed state, and analyzing the result. The results are illustrated in Table 2.

TABLE 2

| No Load Life Tests | | |
|---|---|---|
| Temperature | Hours | Results |
| −50° C. | 17.5 | Good - The worst part exhibited a shift of 3.5° C. |
| Room | 400 | Good - The worst part exhibited less than 1° C. change at room temperature |
| 150° C. | 192 | Good - The worst part exhibited a 2.7° C. shift at room temperature |
| 204° C. | 192 | Good - The worst part exhibited a 1.8° C. shift at room temperature |
| 300° C. | 60 | Very good - Less than 2 Ohms change |
| 500° C. | 16 | Good - Less than 1° C. change at room temperature; Worst - one part had a 4° C. change |
| 700° C. | 48 | Good - Less than 1° C. change at room temperature |
| 750° C. | 100 | Good - Worst part had a 2.55° C. change at 450° C. |
| 1000° C. | 100 | Good - Worst part 18.4° C. at 750° C. |
| 1100° C. | 30 | Good - Worst part −5.5° C. at room temperature |
| 1000° C./1100° C. | 100/30 | Fair, most less than 10° C. shift |

The cycle test, the results of which are found in Table 3, involved repeatedly exposing thermistors to temperature fluctuation. A part is placed into an oven, oil bath or freezer, etc. at a certain temperature for a certain period of time and then removed. This is repeated some number of times. Tests are then performed to determine the amount of change, if any, in resistance at measuring temperatures. In this test, each piece was exposed to a temperature source for 5 to 6 minutes, unless otherwise noted, and then removed for 5 to 6 minutes before re-exposure to the temperature source (oven, oil bath, freezer, etc.).

Introduction and removal was kept to a constant rate of about 10 seconds.

TABLE 3

| Temperature | Cycles | Results |
| --- | --- | --- |
| 50° C. - Room | 6 | Good - The part was glazed |
| 600° C. - Room | 95 | Both bare and glazed parts were tested. The results were good. There was less than a 3.5° C. variation at room temperature for the sum of the 600° C. and 800° C. tests. |
| 800° C. - Room | 293 | See above. |
| 900° C. - Room | 164 | Glazed part varied less than 1° C. at room temperature. |
| 1000 ° C. - Room | 104 | Bare parts exhibited good behavior less than 4° C. variation at room temperature. |
| 1100° C. - Room | 30 (1 hr at 1100° C.) | Bare and glazed parts were good. Worst results a glazed part at 750° C. showed a 23.3° C. variation. |

The resistance/temperature characteristics of the thermistors were also measured. The results are listed below in table 4.

TABLE 4

| Temperature [° C.] | R [Ohms] |
| --- | --- |
| −50 | 2,910,000 |
| 25 | 188,000 |
| 150 | 11,000 |
| 300 | 1,700 |
| 450 | 480 |
| 750 | 93 |
| 900 | 59 |
| 1000 | 48 |
| 1100 | 41 |

As the above text indicates, the Y and Cr containing thermistors of the present invention can be successfully used, in both glazed and unglazed conditions, over a wide range of temperatures from −50° C. to 1100° C. These yttrium based thermistors are comparable to the lanthanum/chromium thermistors of the prior art in all respects with the additional advantage that there isn't a severe low-temperature drift effect and the resistance values are readable over the entire temperature range. Indeed, these tests demonstrate that the resistance-temperature characteristics are stable over the life of the thermistor and do not significantly change on repeated exposures to various temperatures. Moreover, glazing while possibly better in terms of aging and certain high temperature indications, is not essential to prevent an undesirable shift in the resistance properties of the material is observed with lanthanum.

I claim:

1. A ceramic composition comprising: X, wherein X is a rare earth metal, and a stoichiometric excess of Cr, said ceramic composition including at least a first phase having the formula $XCrO_3$ and at least a second phase having the formula $Cr_2O_3$.

2. The ceramic composition of claim 1 wherein said Cr is provided in an excess of between about 1 and 9800 mole %, based on the total content of X in the composition.

3. The ceramic composition of claim 2 wherein said Cr is provided in an excess of between about 300 and 500 mole %, based on the total content of X in the composition.

4. The ceramic composition of claim 1 wherein said X is provided in an amount of between about 1 and 49 mole %, based on the total content of metals in the composition.

5. The ceramic composition of claim 4 wherein said X is provided in an amount of between about 10 and 20 mole %, based on the total content of metals in the composition.

6. The ceramic composition of claim 1 wherein said Cr is provided in an amount of between about 51 and 99 mole %, based on the total content of metals in the composition.

7. The ceramic composition of claim 6 wherein said Cr is provided in an amount of between about 70 and 80 mole %, based on the total content of metals in the composition.

8. The ceramic composition of claim 1 further comprising a predetermined amount of at least one component M wherein M is or contains Ti, Ca, Si, Al, Mg, Sr, Ba, Zr, Hf, Ge, or Ce and where said predetermined amount of said at least one component M in said ceramic composition is less than the amount of X in same.

9. The composition of claim 8 further comprising a plurality of said components M, provided that the total amount of said components M in said ceramic composition does not exceed the amount of X in same.

10. The ceramic composition of claim 9 wherein the predetermined amount of said components M ranges from between about 1 to about 20 mole %, based on the total content of metals in the composition.

11. The ceramic composition of claim 10 wherein the predetermined amount of said components M ranges from between about 5 to about 15 mole %, based on the total content of metals in the composition.

12. The ceramic composition of claim 1 wherein said rare earth element is selected from the group consisting of Pr, Nd, Sm, Eu, Gd, Tb, Dy, Er, Yb and Y.

13. A ceramic composition comprising: X, wherein X is a rare earth metal, and a stoichiometric excess of Cr, and including at least a first phase having the formula $XCrO_3$ and at least a second phase having the formula $Cr_2O_3$, Ti provided in an amount of between about 1 and about 8 mole %, based on the total content of metals in the ceramic composition, Si provided in an amount of between about 0.5 and about 6 mole %, based on the total content of metals in the ceramic composition, Ca provided in an amount of between about 0.5 and about 6 mole %, based on the total content of metals in the ceramic composition.

14. The ceramic composition of claim 12 wherein X is provided in an amount of between about 5 and about 30 mole %, based on the total content of metals in the ceramic composition, Cr is provided in an amount of between about 60 and about 90 mole %, based on the total content of metals in the ceramic composition, Ti is provided in an amount of between about 2 and about 6 mole %, based on the total content of metals in the ceramic composition, Si is provided in an amount of between about 1 and about 4 mole %, based on the total content of metals in the ceramic composition, and Ca is provided in an amount of about 1 and about 4 mole % based on the total content of metals in the ceramic composition.

15. The ceramic composition of claim 13 wherein X is provided in an amount of between about 10 and about 20 mole %, based on the total content of metals in the ceramic composition, Cr is provided in an amount of between about 70 and about 80 mole %, based on the total content of metals in the ceramic composition, Ti is provided in an amount of between about 3 and about 5 mole %, based on the total content of metals in the ceramic composition, Si is provided in an amount of between about 2 and about 3 mole %, based on the total content of metals in the ceramic composition, and Ca is provided in an amount of about 2 and about 3 mole %, based on the total content of metals in the ceramic composition.

16. A ceramic composition comprising Y and a stoichiometric excess Cr, said ceramic composition including at least a first phase having the formula $YCrO_3$ and at least a second phase having the formula $Cr_2O_3$.

17. The ceramic composition of claim 16 wherein Y is provided in an amount of between about 10 and about 20 mole % based on the total content of metal in the ceramic composition, Cr is provided in an amount of between about 70 and about 80 mole % based on the total content of metal in the ceramic composition.

18. The ceramic composition of claim 17 further comprises Ti provided in an amount of between about 3 and about 5 mole % based on the total content of metal in the ceramic composition, Si provided in an amount of between about 2 and about 3 mole % based on the total content of metal in the ceramic composition and Ca, provided in an amount of between about 2 and about 3 mole % based on the total content of metal in the ceramic composition.

* * * * *

UNITED STATES PATENT AND TRADEMARK OFFICE
CERTIFICATE OF CORRECTION

PATENT NO.   :   6,136,231
DATED        :   October 24, 2000
INVENTOR(S)  :   David J. Sorg It is certified that error appears in the above-identified patent and that said Letters Patent is hereby corrected as shown below:

Column 1, line 59, cancel the word "was" and insert --were--.
Column 2, line 4, cancel "0C" and insert --0°C--.
Column 5, line 67, cancel "to" and insert --two--.
Column 8, line 48, cancel "12" and insert --13--.
Column 8, line 61, cancel "13" and insert --14--.

Signed and Sealed this

Twenty-second Day of May, 2001

Attest:

NICHOLAS P. GODICI

Attesting Officer

Acting Director of the United States Patent and Trademark Office